O. F. BENNETT.
PIPE COUPLING.
APPLICATION FILED OCT. 27, 1914.

1,200,798.

Patented Oct. 10, 1916.

Witnesses,
H. B. Davis.
R. Connell.

Inventor;
Orville F. Bennett
by Voyer & Hannigan
Attys.

UNITED STATES PATENT OFFICE.

ORVILLE F. BENNETT, OF HAVERHILL, MASSACHUSETTS.

PIPE-COUPLING.

1,200,798.  Specification of Letters Patent.  Patented Oct. 10, 1916.

Application filed October 27, 1914. Serial No. 868,798.

*To all whom it may concern:*

Be it known that I, ORVILLE F. BENNETT, a citizen of the United States, residing at Haverhill, in the county of Essex and State of Massachusetts, have invented an Improvement in Pipe-Couplings, of which the following is a specification.

This invention relates to certain improvements in pipe couplings and more particularly to pipe couplings which are designed and intended to form a permanent connection between a lead pipe and an iron pipe, to avoid the expense of employing a brass nipple and making a wiped joint therebetween, as has been customary.

Figure 1:
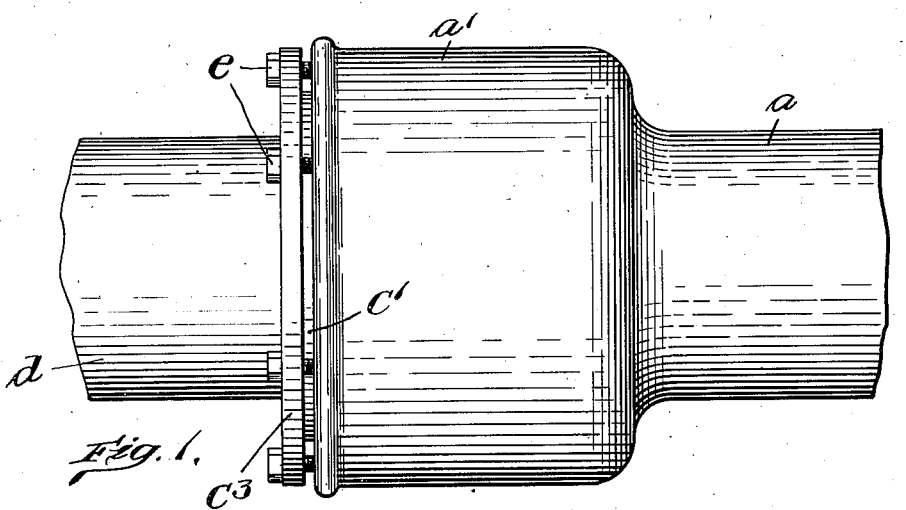
Figure 2:
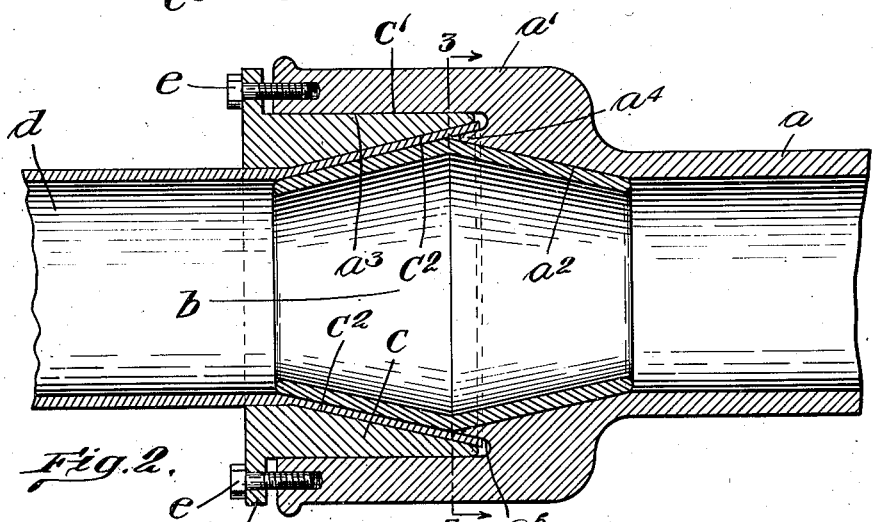
Figure 3:
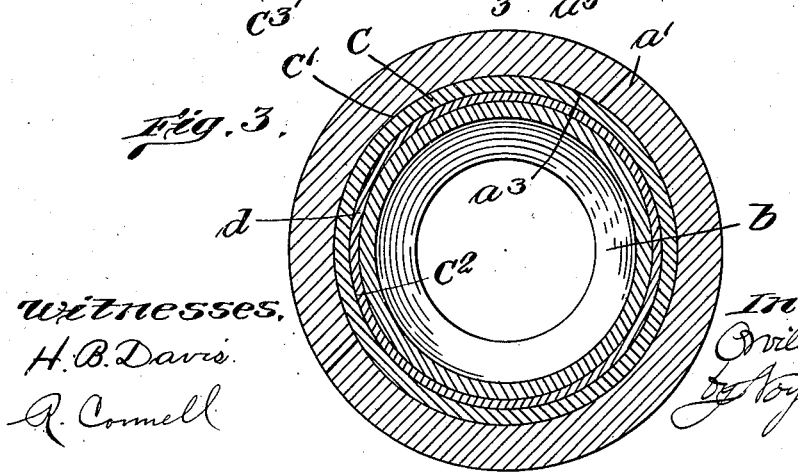

The object of my invention is to provide a form of pipe coupling of the above described character, which is of simple construction and which may be readily assembled, so that the expense of making the joint will be materially less than would be required to make a wiped joint and which, further, will be absolutely tight, so that all possibility of leakage will be avoided and more specifically, my object is to provide a coupling having these characteristics in connection with an ordinary cast iron pipe having the usual hub at one end, so that the necessity of making special castings for the purpose may be avoided. I accomplish these objects by the means shown in the accompanying drawing, in which:

Figure 1 is a side elevation. Fig. 2 is a longitudinal, central, sectional view of a pipe coupling embodying my invention, and, Fig. 3 is a cross sectional view on the line 3—3 of Fig. 2.

In the drawing, $a$ indicates an ordinary cast iron pipe having a hub portion $a'$ which is of similar form to the hub, or socket ordinarily employed, but constructed differently in the particulars hereinafter stated.

According to my invention, the portion adjacent the points when the hub is connected to the main portion of the pipe is somewhat thickened, and the bore thereof, at this point is formed to taper inwardly, a smooth, conical face $a^2$ being provided. The inner surface of the hub is cylindrically formed, to provide a cylindrical surface $a^3$, and an annular lip $a^4$ is extended from the main portion of the pipe into the hub portion, the inner face of said lip being continuous with the face $a^2$, and the outer face $a^5$ thereof being conically formed to taper convergently thereto toward the ends of the lip.

I further provide a double tapered push-nipple $b$, of a form similar to that employed in connecting radiator sections, the exterior tapering surface, or conical end portions thereof, corresponding to the conical surface $a^2$ of the pipe $a$, so that either end may be forced into said pipe to form a tight joint. The parts are so formed that when the nipple $b$ is forced into the end of the pipe $a$ to a certain point, which is preferably such that the outer end of the nipple is flush with the hub end of the pipe, the inner tapered portion of the nipple will fit tightly against the surface $a^2$, forming a tight joint therebetween. The arrangement is such, that, when the nipple $b$ has been forced into this position, its outer tapering surface will be in line with the surface $a^5$ of the lip $a^4$.

A wedging ring $c$ is provided, having a cylindrical outer side $c^1$, which is adapted to fit closely into the end of the hub against the surface $a^3$, and a conical inner surface $c^2$, which is disposed at the same angle, with relation to the center line of the pipe as the conical surface of the outer end-portion of the nipple $b$.

In assembling the parts, the end portion of the lead pipe $d$, which is to be connected to the iron pipe, is expanded on a taper to correspond with the conical end of the nipple $b$ and said expanded end portion is then pushed onto the outer end-portion of the nipple $b$, and forced thereon until the end portion of the pipe passes beyond the middle portion of the nipple, and slides onto the face $a^5$ of the lip $a^4$. The wedging ring $c$ is then forced into the hub of the pipe, so that it firmly presses the lead pipe against the outer end-portion of the nipple $b$, and said forcing operation is carried far enough so that its inner end will press the extreme inner end of the lead pipe firmly against the face $a^5$ of the lip $a^4$. Any suitable means for pressing the wedging ring into clamping position may be employed, as the bolts $e$, which are passed through a flange $c^3$ on the wedging ring $c$, and threaded into the hub $a'$ of the pipe. A tight joint will thus be formed between the lead pipe and the outer end portion of the nipple, and, while the joint between the face $a^2$ of the pipe $a$ and the inner end portion of the nipple $b$ will, if properly formed, be sufficiently tight to avoid all possibility of leakage, yet the action of the wedging ring in pressing the end of the lead pipe against the face $a^5$, furnishes additional security in case of leakage at this joint. It will also be observed that the action of the wedging ring causes the inner end of the nipple to be forced against its seat in the pipe and to be held thereagainst. All possibility of leakage, therefore, past either end of the push nipple is prevented.

The iron pipe, constructed as above described, may be cast without difficulty and the surfaces $a^2$, $a^3$, and $a^5$ may be finished with a special reamer, at one operation. The push nipples may be made at small expense, and usually are made by a rolling process, so that no machining is necessary, and the tapering bore of the wedging ring may or may not be finished, although it is, also, preferably smoothed with a reamer. There is, therefore, no necessity of the expense of any lathe work in the process of manufacture, so that the parts necessary to the joint may be made at small expense, and at less expense than the parts necessary to the wiped joint connection, which fact, coupled with the fact that the labor cost of making my joint is much less than that of making the wiped joint, enables an important saving to be made on this account, the reliability of the joint being, at the same time, increased.

I claim:—

1. A pipe coupling comprising a rigid metal pipe-section having a hub at one end, and an internal, conically-shaped face tapering inwardly from the inner end of the bore of the hub, a rigid metal nipple having two external, oppositely-disposed, conically-shaped faces tapering toward each end and arranged in said pipe section with its inner conical face tightly seated against the said face of the pipe section and with its outer face surrounded by said hub, and a wedging ring within the hub adapted to receive the end-portion of a ductile metal pipe therein, and to clamp the same against said outer face of the nipple.

2. A pipe coupling comprising a rigid metal pipe-section having a hub at one end and an internal, conically-shaped face tapering inwardly from the inner end of the bore of the hub, an annular lip integral with said pipe-section and projecting within the hub from the inner end of its bore and having an outwardly tapering conical face on its outer side, a rigid metal nipple having two external, oppositely-disposed, conically-shaped faces tapering from the middle thereof toward each end and arranged in said pipe-section with its inner conical face seated against said face of the pipe-section, and its outer portion projecting into the hub beyond the edge of said lip, and a wedging ring adapted and arranged to receive the end-portion of a ductile metal pipe, and to clamp the same onto the outer portion of said nipple, and onto the conical face of said lip.

In testimony whereof, I have signed my name to this specification, in the presence of two subscribing witnesses.

ORVILLE F. BENNETT.

Witnesses:
L. H. HARRIMAN,
H. B. DAVIS.